United States Patent
He et al.

(10) Patent No.: US 12,402,139 B2
(45) Date of Patent: *Aug. 26, 2025

(54) FAST SECONDARY CELL ACTIVATION WITH TEMPORARY REFERENCE SIGNALS

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/760,029

(22) PCT Filed: Aug. 5, 2021

(86) PCT No.: PCT/CN2021/110992
§ 371 (c)(1),
(2) Date: Aug. 3, 2022

(87) PCT Pub. No.: WO2023/010444
PCT Pub. Date: Feb. 9, 2023

(65) Prior Publication Data
US 2024/0188089 A1    Jun. 6, 2024

(51) Int. Cl.
*H04L 5/00*   (2006.01)
*H04W 72/23*  (2023.01)
*H04W 52/52*  (2009.01)

(52) U.S. Cl.
CPC ......... *H04W 72/23* (2023.01); *H04L 5/0048* (2013.01); *H04W 52/52* (2013.01)

(58) Field of Classification Search
CPC .. H04J 11/0076; H04L 1/0025; H04L 1/1614; H04L 5/001; H04L 5/0048;
(Continued)

(56) References Cited

U.S. PATENT DOCUMENTS 11,240,809 B2 *   2/2022   Tsai .................. H04W 56/0015
11,451,359 B2 *   9/2022   Lin ....................... H04L 1/1812
(Continued)

FOREIGN PATENT DOCUMENTS

CN   110149178   8/2019
CN   111492611   8/2020
(Continued)

OTHER PUBLICATIONS

Nokia, Nokia Shanghai Bell, SCell and Temporary RS activation, 3GPP TSG-RAN WG2 Meeting #115 Electronic, R2-2107984, 4 pages, Aug. 16-27, 2021.*
(Continued)

*Primary Examiner* — Frank Duong
(74) *Attorney, Agent, or Firm* — Fay Kaplun & Marcin, LLP

(57) ABSTRACT

A user equipment (UE) configured to receive secondary cell (SCell) activation configuration information from a first cell, receive a medium access control (MAC) control element (CE) from the first cell, wherein the MAC CE indicates that a SCell state is to be changed from a deactivated state to an activated state and receive aperiodic reference signals from a secondary cell (SCell), wherein the reception of the aperiodic reference signals is triggered by the MAC CE.

20 Claims, 12 Drawing Sheets

(58) Field of Classification Search
CPC .......... H04L 5/0053; H04L 5/0098; H04L 27/26025; H04W 48/12; H04W 52/52; H04W 72/0446; H04W 72/23; H04W 76/15; H04W 76/25; H04W 76/27
See application file for complete search history.

(56) References Cited

U.S. PATENT DOCUMENTS

| | | | |
|---|---|---|---|
| 11,533,149 B2 | 12/2022 | Hsieh et al. | |
| 11,632,709 B2 * | 4/2023 | Babaei | H04W 48/16 370/329 |
| 11,653,413 B2 * | 5/2023 | Tang | H04B 7/0626 370/329 |
| 12,010,639 B2 * | 6/2024 | Yang | H04W 56/001 |
| 2020/0177336 A1 * | 6/2020 | Li | H04W 72/54 |
| 2021/0068129 A1 * | 3/2021 | Ryu | H04W 80/02 |
| 2021/0111851 A1 | 4/2021 | Lin | |
| 2022/0022067 A1 * | 1/2022 | Kim | H04L 5/0098 |
| 2022/0131669 A1 * | 4/2022 | Takeda | H04L 5/0048 |
| 2022/0166538 A1 | 5/2022 | Miao | |
| 2022/0167359 A1 | 5/2022 | Miao | |
| 2022/0225215 A1 * | 7/2022 | Babaei | H04W 76/15 |
| 2022/0247529 A1 * | 8/2022 | Takeda | H04W 72/0446 |
| 2022/0345278 A1 | 10/2022 | Miao | |
| 2023/0239126 A1 | 7/2023 | Liu et al. | |
| 2024/0056960 A1 * | 2/2024 | Axmon | H04W 48/20 |
| 2024/0063991 A1 * | 2/2024 | Liu | H04L 5/0094 |
| 2024/0235774 A1 * | 7/2024 | Nimbalker | H04L 5/0051 |

FOREIGN PATENT DOCUMENTS

| | | |
|---|---|---|
| CN | 111934837 | 11/2020 |
| WO | 2021/003678 | 1/2021 |
| WO | 2021/063400 | 4/2021 |
| WO | 2022/238502 | 11/2022 |

OTHER PUBLICATIONS

Huawei, HiSilicon, On RAN4 Ls on Temporary RS for SCell activation, 3GPP TSG-RAN WG2 Meeting #115-e, R2-2108450, 5 pages, Aug. 9-27, 2021.*
OPPO, Discussion on TRS activation for fast SCell activation, 3GPP TSG-RAN WG2 Meeting #115 electronic, R2-2107021, 8 pages, Aug. 16-27, 2021.*
RAN WG4, Reply LS on temporary RS for efficient SCell activation in NR CA, 3GPP TSG-RAN WG4 Meeting # 99-e, R4-2108364, 2 pages, Aug. 19-27, 2021.*
Apple Inc., On efficient SCell Activation/Deactivation, 3GPP TSG-RAN WG1 #104e, e-Meeting, R1-210364, 5 pages, Jan. 25 to Feb. 5, 2021.*
Spreadtrum Communications, Discussion on efficient activation/de-activation mechanism for SCells in NR CA, 3GPP TSG RAN WG1 #104-e, e-Meeting, R1-2100795, 4 pages, Jan. 25 to Feb. 5, 2021.*
Huawei et al., "Discussion on low latency SCell activation and efficient SCell management", 3GPP TSG RAN WG1 #99, R1-1911875, Nov. 9, 2019, 13 sheets.
ZTE, "Discussion on Supporting Efficient Activation/De-activation Mechanism for SCells in NR CA", 3GPP TSG RAN WG1#104b-e, R1-2102504, Apr. 7, 2021, 6 sheets.
Samsung, "On efficient activation/deactivation mechanism for SCells", 3GPP TSG RAN WG #104e, R1-2101239, Jan. 19, 2021, 4 sheets.
Nokia et al., "Fast SCell Activation", 3GPP TSG-RAN WG2, Meeting #108, R2-1915062, Nov. 22, 2019, 7 sheets.
Interdigital, Inc. "Fast SCell Activation", 3GPP TSG RAN WG1, #104-bis-e, R1-2103203, Apr. 20, 2021, 5 sheets.
ZTE Corporation et al., "On CSI reporting during SCell Activation", 3GPP TSG-RAN WG1, Meeting #106, R2-1907098, May 17, 2019, 3 sheets.
Vivo, "Discussion on efficient activation/de-activation mechanism for Scells", 3GPP TSG-RAN WG1 Meeting #103-e, R1-2007697, Nov. 1, 2020, 3 sheets.
Moderator (Huawei), "Summary #1 of efficient SCell activation/de-activation mechanism of NR CA", 3GPP TSG RAN WG1 Meeting #10b-e, R1-210xxxx, Apr. 12-20, 2021, 23 sheets.

* cited by examiner

Table 500

| | Condition 1 | Condition 2 | Number of reference signal bursts | Row |
|---|---|---|---|---|
| FR1 | Known SCell | P<=160 | 1 burst (4 samples) | 510 |
| | Unknown SCell | P>160 | 2 bursts (8 samples) | 515 |
| | | Intra-band Contiguous CA | 1 burst (4 samples) | 520 |
| FR2 | Know SCell | At lest one active CC on the same FR2 band | 1 burst (4 samples) | 525 |
| | | Other Cases | 1 burst (4 samples) | 530 |
| | Unknown SCell | At lest one active CC on the same FR2 band | 1 burst (4 samples) | 535 |

Fig. 5

| TS | Aperiodic offset value | QCL source |
|---|---|---|
| '00' | $\Delta_1$ | SSB1 (e.g., TCI-State ID #1) |
| '01' | $\Delta_1$ | SSB2 (e.g., TCI-State ID #2) |
| '10' | $\Delta_2$ | SSB1 (e.g., TCI-State ID #1) |
| '11' | $\Delta_2$ | SSB2 (e.g., TCI-State ID #2) |

Table 700

ASN.1 fastSCellActivationTRS ::=   SEQUENCE {
fastSCellActivation-info     ENUMERATED {
                             TRS Resource Set ID,
                             TRS Resources,
                             Aperiodic triggering offset
                             QCL information
...,
}

FAST SECONDARY CELL ACTIVATION WITH TEMPORARY REFERENCE SIGNALS

TECHNICAL FIELD

This application relates generally to wireless communication systems, and in particular relates to fast secondary cell activation with temporary reference signals.

BACKGROUND

A network may configure a user equipment (UE) with multiple serving cells. For example, in a dual connectivity (DC) scenario, the network may configure the UE with a primary cell group (PCG) comprising a primary cell (PCell) and zero or more secondary cells (SCells) and a secondary cell group (SCG) comprising a primary secondary cell (PSCell) and zero or more SCells. Each SCell may increase the possible downlink and/or uplink data rate for its corresponding cell group. However, maintaining a SCell radio link may cause the UE to experience a power drain. Therefore, it may be beneficial for the network to implement a fast SCell activation and deactivation scheme that balances the performance benefits of SCells and the corresponding power cost at the UE.

SUMMARY

Some exemplary embodiments are related to a processor of a user equipment (UE) configured to perform operations. The operations include receiving secondary cell (SCell) activation configuration information from a first cell, receiving a medium access control (MAC) control element (CE) from the first cell, wherein the MAC CE indicates that a SCell state is to be changed from a deactivated state to an activated state and receiving aperiodic reference signals from a secondary cell (SCell), wherein the reception of the aperiodic reference signals is triggered by the MAC CE.

Other exemplary embodiments are related to a processor of a user equipment (UE) configured to perform operations. The operations include receiving data over a physical downlink shared channel (PDSCH), determining whether the PDSCH includes a medium access control (MAC) control element (CE) for synchronization signal block (SSB) based SCell activation and determining whether the PDSCH includes a MAC CE for SCell activation with tracking reference signal (TRS) triggering.

Still further exemplary embodiments are related to a processor of a base station configured to perform operations. The operations include transmitting secondary cell (SCell) activation configuration information to a user equipment (UE), transmitting a medium access control (MAC) control element (CE) from the first cell, wherein the MAC CE indicates that a SCell state is to be changed from a deactivated state to an activated state, wherein the reception of the aperiodic reference signals at the UE is triggered by the MAC CE and receiving hybrid automatic repeat request (HARQ) feedback from the UE in response to the MAC CE.

BRIEF DESCRIPTION OF THE DRAWINGS

FIG. 5 shows a table illustrating an example configuration of a minimum number of temporary reference signal bursts triggered by a medium access control (MAC) control element (CE) according to various exemplary embodiments.

FIG. 8 shows an example abstract syntax notation one (ASN.1) for SCell activation configuration information according to various exemplary embodiments.

DETAILED DESCRIPTION

Figure 1:
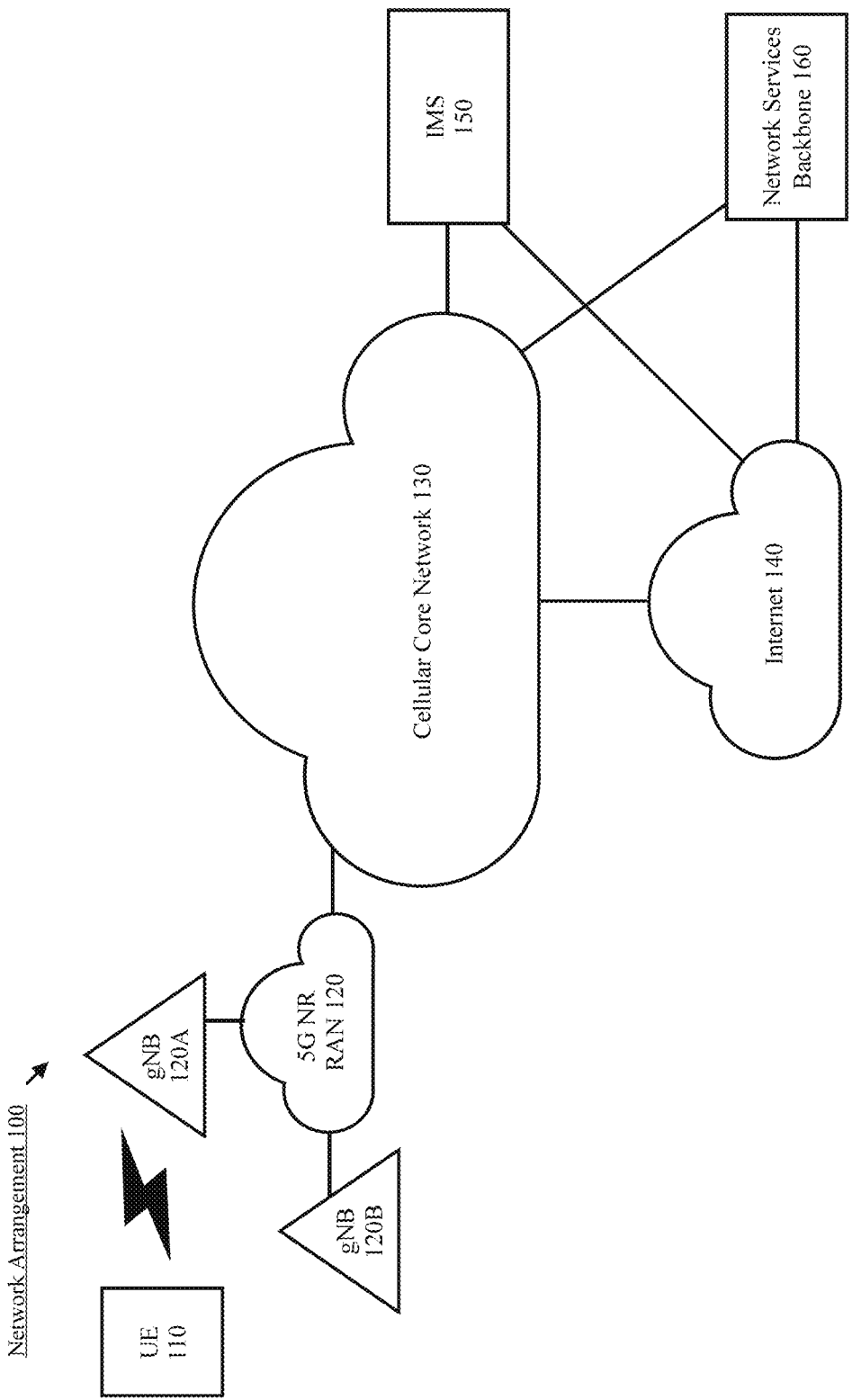
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce techniques for fast secondary cell (SCell) activation and deactivation.

The exemplary embodiments are described with regard to a user equipment (UE). However, reference to the term UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a SCell. Those skilled in the art will understand that a SCell may be utilized in carrier aggregation (CA), dual connectivity (DC) or any other appropriate type of scenario in which the UE is configured with multiple serving cells. To provide an example, in a CA scenario, the UE may be configured with a primary cell (PCell) and one or more SCells. To provide another example, in a DC scenario, the UE may be connected to a primary node (PN) and a secondary node (SN). The PN may be one of multiple nodes that form a primary cell group (PCG) and the SN may be one of multiple nodes that form a secondary cell group (SCG). The nodes of the cell groups may be further characterized by their roles within their respective cell group. For instance, the PCG may comprise a PCell and zero or more SCells. Throughout this description, the terms "PN" and "PCell" may be used interchangeably. The SCG may comprise a primary secondary cell (PSCell) and zero or more SCells. Throughout this description, the terms "SN" and "PSCell" may also be used interchangeably.

In addition, the exemplary embodiments are described with regard to SCell activation and deactivation. Those skilled in the art will understand that a deactivated SCell may refer to a type of SCell configuration where one or more SCell bearers remain intact but the UE does not perform various operations associated with maintaining the SCell configuration. SCell deactivation may provide various benefits on the UE side and the network side. For example, a deactivated SCell may provide power saving benefits to the UE with regard to data exchange processing. Power efficiency benefits are also realized on the network side. In addition, activating a deactivated SCell may provide the UE with faster access to SCell radio resources compared to scenarios in which the SCell is released and then recovered or a new SCell configuration is established. This may reduce latency with regard to data transmission and reception at the UE. The exemplary embodiments introduce techniques for efficient SCell activation and deactivation.

To provide some examples of potential UE behavior on a deactivated SCell, consider the following exemplary scenario in which the UE is connected to a PCell and a SCell. At a first time, the SCell configuration is activated. Thus, with regard to the SCell, the UE may be configured to perform operations related to processes such as, but not limited to, radio link monitoring (RLM), layer 1 (L1) measurements, channel state information (CSI) reporting, beam failure detection (BFD), beam failure recovery (BFR), data transmission, data reception and radio resource management (RRM). Subsequently, SCell deactivation may be triggered, e.g., the SCell configuration state may transition from "activated" to "deactivated." When the SCell is in the deactivated state, the UE may intentionally restrict or omit performing various operations related to the SCell such as, but not limited to, RLM, L1 measurements, CSI reporting, BFD, BFR, data transmission and data reception.

As will be described in more detail below, SCell activation and deactivation may be triggered by a medium access control (MAC) control element (CE). In one aspect, the exemplary embodiments introduce a MAC CE that triggers both SCell activation and temporary aperiodic reference signals. In another aspect, the exemplary embodiments include techniques for supporting a combination of third generation partnership (3GPP) release 16 (rel-16) synchronization signal/PBCH block (SSB) based SCell activation and the above-referenced SCell activation with temporary aperiodic reference signals.

Throughout this description, any reference to a particular type of UE behavior or network side behavior described within the context of an activated or deactivated SCell is merely provided for illustrative purposes. The exemplary embodiments may be used in conjunction with current implementations of activated and deactivated SCell configurations, future implementations of activated and deactivated SCG configurations or independently from other activated and deactivated SCG configurations. In addition, those skilled in the art will understand that although various examples are described with regard to SCell activation and deactivation, the exemplary techniques described herein are also applicable to SCG activation and deactivation.

FIG. 1 shows an exemplary network arrangement 100 according to various exemplary embodiments. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IOT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., next generation Node B (gNB) 120A or gNB 120B.

To provide an example of a CA scenario within the context of the network arrangement 100, the gNB 120A may represent a PCell providing a primary component carrier (PCC) and the gNB 120B may represent a SCell providing a secondary component carrier (SCC). In an actual CA scenario, any appropriate number of SCells and CCs may be configured. Thus, the example of a two gNBs 120A, 120B is merely provided for illustrative purposes. The exemplary embodiments may apply to any CA scenario in which SCell activation and deactivation or any other similar type of scheme is utilized.

To provide an example of a DC scenario within the context of the network arrangement 100, the UE 110 may communicate with the gNB 120A representing a PN of a PCG comprising a PCell and zero or more SCells and the gNB 120B representing a SN of a SCG comprising a PSCell and zero or more SCells. Those skilled in the art will understand that a cell group may be configured in a wide variety of different ways and may include any appropriate number of nodes. The exemplary embodiments apply to any DC scenario in which SCell (or SCG) activation and deactivation, or any other similar mechanism is utilized.

The network arrangement 100 shows both the gNB 120A and the gNB 120B being associated with the same radio access technology (RAT). However, in an actual deployment scenario, the UE 110 may be configured with a PCG and a SCG that are associated with different RATs, e.g., multi-RAT-DC (MR-DC). In some scenarios, a RAN may be deployed that includes architecture that is capable of providing both 5G NR RAT and LTE RAT services. For example, a next-generations radio access network (NG-RAN) (not pictured) may include a gNB that provides 5G NR services and a next generation evolved Node B (ng-eNB) that provides LTE services.

The following exemplary configurations are provided as general examples of DC. In one example configuration, the UE 110 may achieve DC by establishing a connection to at least one cell corresponding to a 5G NR RAN and at least one cell corresponding to an LTE RAN. In another exemplary configuration, the UE 110 may achieve DC by establishing a connection to at least two cells corresponding to an NG-RAN or any other type of similar RAN that supports DC. To provide another example of DC, the UE 110 may connect to one or more RANs that provide 5G NR services. For instance, a NG-RAN may support multiple nodes that each provide 5G NR access, e.g., NR-NR DC. Similarly, the UE 110 may connect to a first RAN that provides 5G NR services and a second different RAN that also provides 5G NR services. Accordingly, the example of a single 5G NR-RAN 120 providing DC is merely provided for illustrative purposes. The exemplary embodiments may apply to any appropriate DC arrangement.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
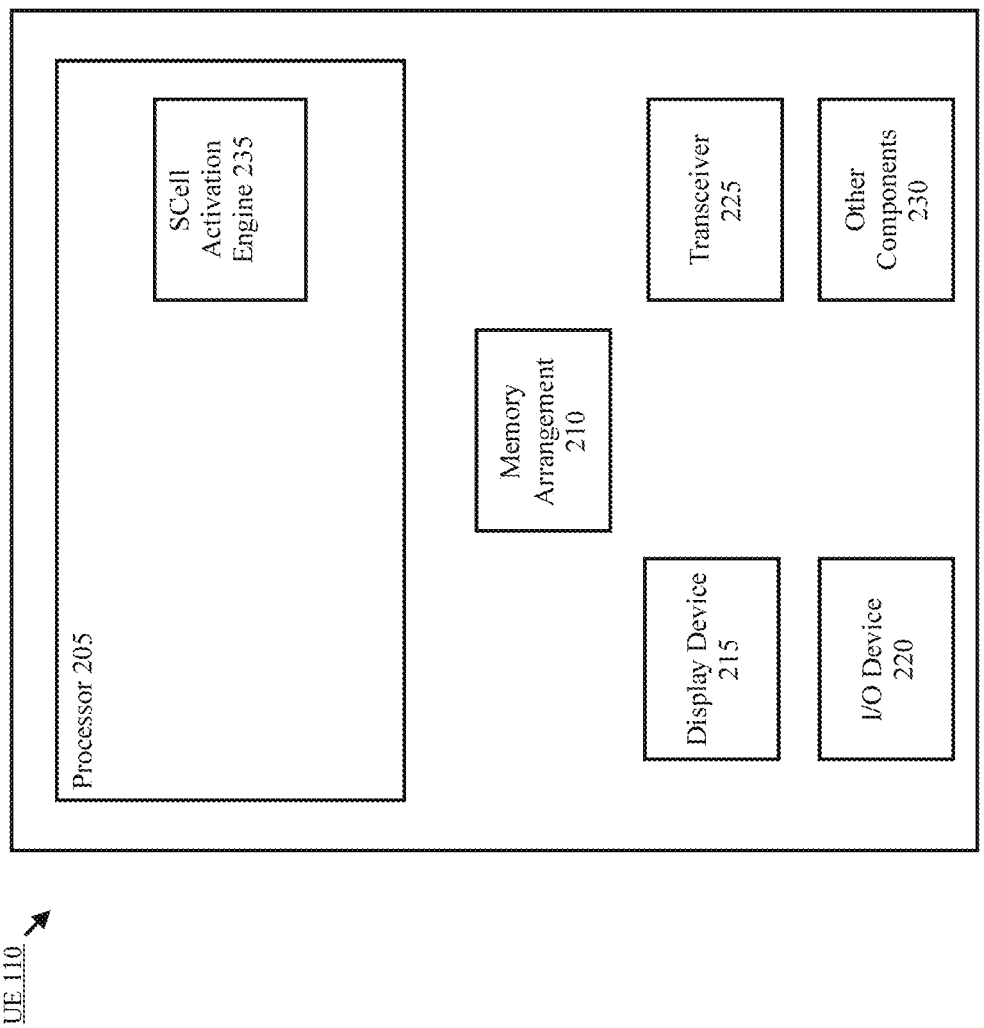
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a SCell activation engine 235. The SCell activation engine 235 may perform various operations related to SCell activation and deactivation such as, but not limited to, receiving temporary aperiodic reference signals and determining whether to utilize an SSB based approach, an aperiodic reference signal based approach or a combination thereof for SCell activation.

The above referenced engine 235 being an application (e.g., a program) executed by the processor 305 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
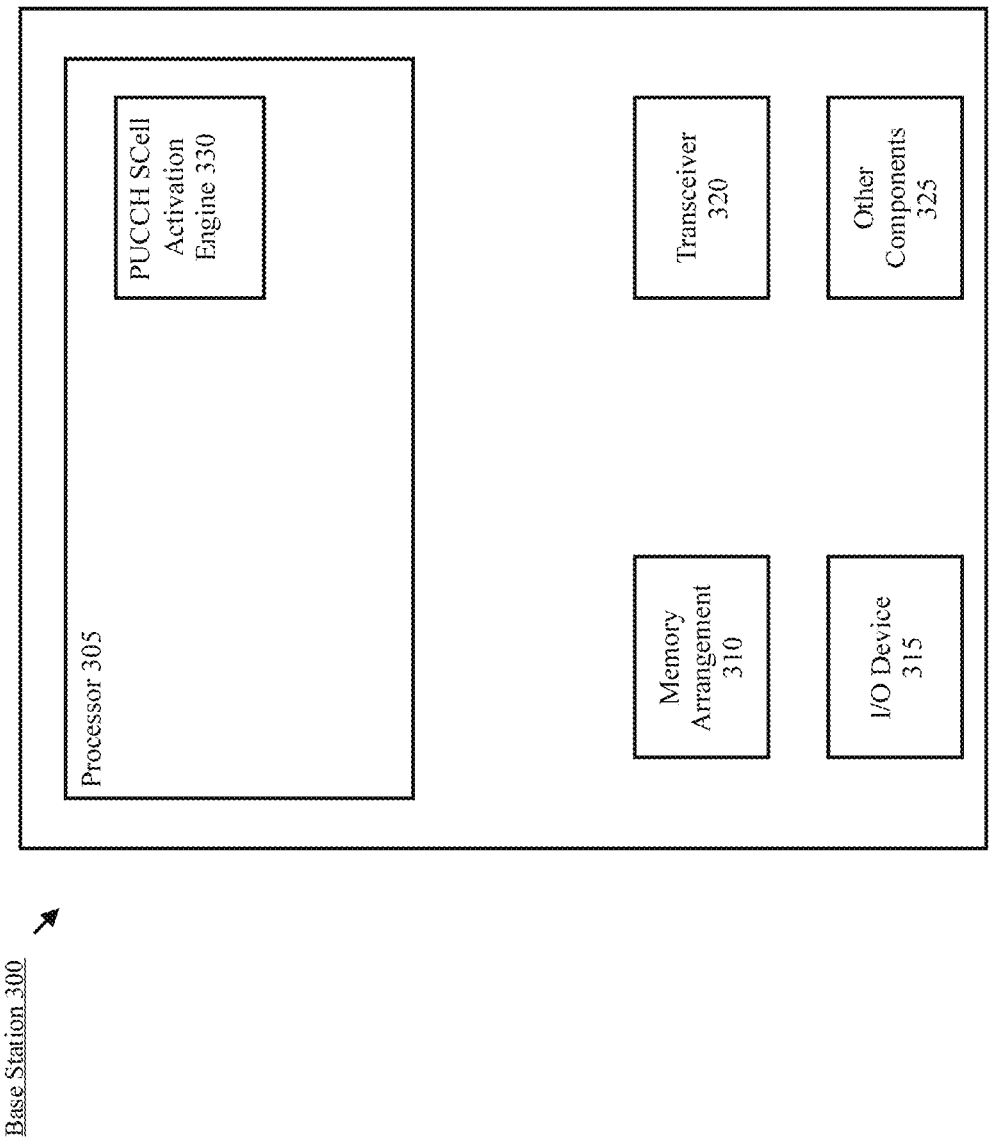
FIG. 3 shows an exemplary base station according to various exemplary embodiments.

FIG. 3 shows an exemplary base station 300 according to various exemplary embodiments. The base station 300 may represent any access node (e.g., gNB 120A, gNB 120B, etc.) through which the UE 110 may establish a connection and manage network operations.

The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices, etc.

The processor 305 may be configured to execute a plurality of engines of the base station 300. For example, the engines may include a SCell activation engine 330. The SCell activation engine 330 may perform various operations related to SCell activation and deactivation such as, but not limited to, scheduling radio resources, transmitting a MAC CE and determining whether an SSB based approach, an aperiodic reference signal based approach or a combination thereof is to be utilized for SCell activation.

The above noted engine 330 each being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

As mentioned above, in one aspect, the exemplary embodiments introduce a MAC CE that is configured to trigger SCell activation and temporary aperiodic reference signals. In some examples, the reference signals may be referred to as a tracking reference signals (TRS) and/or CSI-RS. However, throughout this description, any reference to the aperiodic reference signals as a particular type of reference signal is merely provided for illustrative purposes. The exemplary embodiments may apply to any appropriate type of reference signals.

Figure 4:
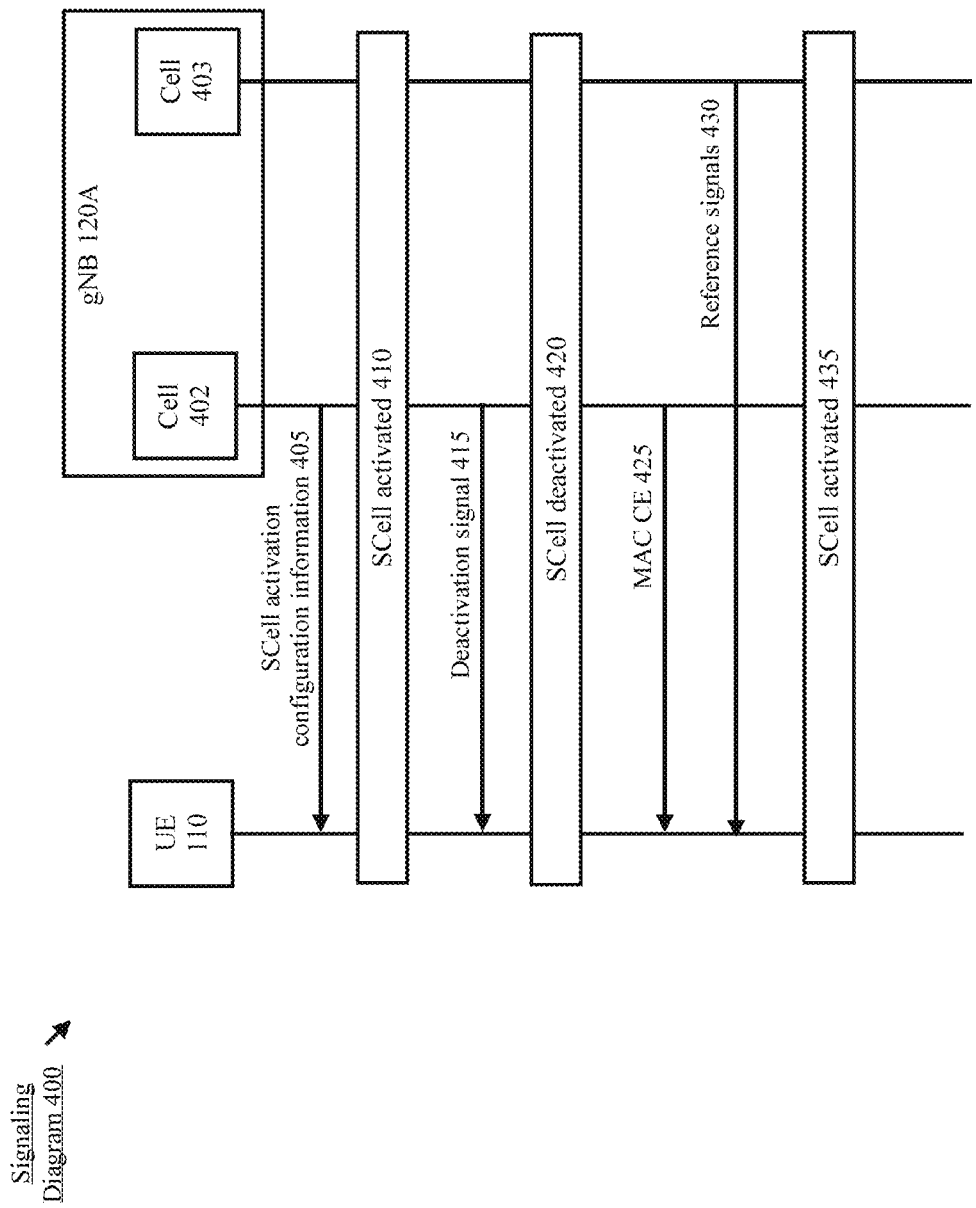
FIG. 4 shows a signaling diagram for secondary cell (SCell) activation with temporary aperiodic reference signals according to various exemplary embodiments.

FIG. 4 shows a signaling diagram 400 for SCell activation with temporary aperiodic reference signals according to various exemplary embodiments. The signaling diagram 400 is provided as a general overview of a scenario in which SCell activation with temporary aperiodic reference signals may be utilized. However, the exemplary embodiments are not limited to this scenario and may be implemented in conjunction with any currently implemented SCell activation schemes, future implementations of SCell activation schemes or independently from other SCell activation schemes.

The signaling diagram 400 includes the UE 110, cell 402 and cell 403. Cell 402 and cell 403 operate on different frequencies but are both controlled by the gNB 120A. However, the exemplary embodiments are not limited to this type of arrangement and may be utilized for any appropriate arrangement of nodes and base stations.

In this example, cell 403 may represent a SCell, the SN of a SCG or any other similar type of cell. Cell 402 may represent a PN, a PCell, a PSCell, a special cell (SpCell) or any other type of cell that may participate in CA with an SCell and/or DC with a SN. Although the examples provided below are described within the context of activating a SCell, those skilled in the art will understand that the exemplary techniques described herein may also be utilized with any currently implemented SCG activation schemes, future implementations of SCG activation schemes or independently from other SCG activation schemes.

In 405, the gNB 120A transmits SCell activation configuration information on the cell 402 to the UE 110. Specific examples of the contents of the SCell activation configuration information will be provided below after the description of the signaling diagram 400. In addition, an example of an abstract syntax notation one (ASN.1) for SCell activation configuration information is shown in FIG. 8.

In some examples, the SCell activation configuration information may be provided to the UE 110 in one or more radio resource control (RRC) messages. For example, the SCell activation configuration information may be provided to the UE 110 in a connection establishment message, a connection modification message, a SCell addition message or any other appropriate type of one or more RRC messages. However, the SCell activation configuration information is not limited to RRC messages and may be provided to the UE 110 in any appropriate manner.

In 410, the SCell (e.g., cell 403) is in the activated state. Those skilled in the art will understand the type of signaling and procedures that may be performed by the UE 110, cell 402, cell 403 and/or other network components to initially configure the cell 403 as an SCell for the UE 110. These signaling exchanges and procedures are beyond the scope of the exemplary embodiments. Instead, as shown below, the exemplary embodiments relate to activating a deactivated SCell.

When the SCell is in the activated state, the UE 110 and the SCell may be configured to exchange information and/or data via the corresponding SCC. In 415, the gNB 120A transmits a deactivation signal to the UE 110 on the cell 402. For example, the network may determine that an amount of data that is to be transmitted and/or received by the UE 110 may be adequately handled by the cell 402 and its corresponding PCC. Thus, the network may transmit a signal to the UE 110 indicating that the SCell is to be deactivated (e.g., cell 403). This deactivation signal may be a MAC CE or any other appropriate type of signal. Instead of or in addition to the MAC CE, one or more predetermined conditions (e.g., thresholds, timers, etc.) may also be configured to indicate to the UE 110 that the SCell is to be deactivated. Thus, in some scenarios, the UE 110 may consider the SCell to be deactivated without any explicit signaling from the network. However, the exemplary embodiments are not limited to any particular type of SCell deactivation mechanism.

In 420, the SCell (e.g., cell 403) is in the deactivated state. When the SCell is in the deactivated state, one or more SCell bearers may remain intact but the UE 110 does not perform various operations associated with maintaining the SCell configuration. This allows for power saving on the UE 110 side and the network side. In addition, activating a deactivated SCell may be faster than establishing an RRC connection to an SCell that has been released.

The network may then determine that the SCell is to be activated. For example, the network may determine that an amount of uplink data to be transmitted by the UE 110 and/or an amount of downlink data to be transmitted by the network to the UE 110 exceeds a threshold value. In response, the network may decide to activate the deactivated SCell to increase the bandwidth available to the UE 110. However, the basis for this determination is beyond the scope of the exemplary embodiments. The exemplary embodiments may apply to SCell activation being triggered based on any appropriate one or more conditions.

In 425, the gNB 120A transmits a MAC CE on the cell 402 to the UE 110. The MAC CE may indicate to the UE 110 that a deactivated SCell is to be activated. In addition, the MAC CE may also indicate to the UE 110 that aperiodic reference signals are to be transmitted on the SCell (e.g., cell 403). In 430, the gNB 120A transmits one or more aperiodic reference signals on the to-be activated SCell (e.g., cell 403) to the UE 110. In 435, the SCell (e.g., cell 403) is in the activated state.

As mentioned above, the UE 110 may receive SCell activation configuration information via RRC signaling. The SCell activation configuration information may include information for an aperiodic reference signal resource set corresponding to a particular SCell (e.g., cell 403) that is to be used for SCell activation purposes. Thus, when the MAC CE to activate cell 403 is received in 425, the UE 110 may know how to receive the reference signals in 430.

In some embodiments, each aperiodic reference signal resource set may include a set of reference signals and corresponding set-specific parameters. For example, the SCell activation configuration information may include a resource set ID which may be used to differentiate between reference signal resource sets. The corresponding reference signals may be configured in a number of bursts where each burst consists of one or more samples. Thus, the SCell activation configuration information may also indicate a number of reference signals and/or a number of bursts for the reference signal resource set.

Throughout this description, a burst of temporary reference signals (TRS) may be referred to as a "TRS burst." However, as mentioned above, the exemplary embodiments are not limited to TRS and the aperiodic reference signals may be any appropriate type of reference signal. In some embodiments, the TRS burst may be defined in a frequency range specific manner, e.g., frequency range 1 (FR1), frequency range 2 (FR2), etc. For example, in FR1, a TRS burst may consist of two slots with four CSI-RS resources (four samples). In FR2, a TRS burst may comprise either one slot with two CSI-RS resources (two samples) or two slots with four CSI-RS resources (four samples).

FIG. 5 shows a table 500 illustrating an example configuration of a minimum number of temporary reference signal bursts triggered by a MAC CE. The UE 110 may validate the aperiodic reference signal resources configured for SCell activation based, in part, on measurement cycle configuration (e.g., discontinuous reception (DRX), etc.) and CA configuration. The type of information included in the table 500 may be hard encoded into the 3GPP Standards or provisioned to the UE 110 in any other appropriate manner.

In table 500, condition 1 indicates that the "known" or "unknown" state of the SCell is to be considered. Those skilled in the art will understand that the "known" or "unknown" state of the SCell is a 3GPP concept described in TS 38.133. Generally, an SCell may be considered "known" if the UE 110 has transmitted a measurement report for the to be activated SCell to the network within a predetermined duration relative to the reception of a MAC CE.

In the table 500, condition 2 describes measurement cycle and CA configuration conditions that are to be considered. Here, the parameter "P" represents the to be activated SCell measurement cycle in units of milliseconds (ms). Row 510 of the table 500 shows that for a known SCell where the corresponding measurement cycle duration is less than the threshold value (P), there is a minimum of one burst (four samples). In this example, the single reference signal burst may be used for automatic gain control (ACG) and time/frequency tracking.

Row 515 of the table 500 shows that for a known SCell where the corresponding measurement cycle duration is greater than the threshold value (P), there is a minimum of two bursts of TRS (eight samples). In this example one burst may be used for AGC settling and the other burst may be used for time/frequency tracking.

Row 520 of the table 500 shows that for an unknown SCell where intra-band contiguous CA is configured, there is a minimum of one burst (four samples). However, in this example, a SSB may also be used for cell detection.

Row 525 of the table 500 shows that for a known SCell where at least one active CC is on the same FR2 band, there is a minimum of one burst (four samples). In this example, the single burst may be used for both ACG and time/frequency tracking.

Row 530 of the table 500 shows that for a known SCell in scenarios other than at least one active CC is on the same FR2 band.

Row 535 of the table 500 shows that for an unknown SCell where at least one active CC on the same FR2 band, there is a minimum of one burst (four samples).

During operation, the UE 110 determines whether the reference signal burst number that is first indicated in the SCell activation configuration information and then triggered by an SCell activation MAC CE is valid. When the burst number is invalid the UE 110 may fallback to the rel-16 SSB based SCell activation approach. For example, the UE 110 may compare the indicated value by the SCell activation MAC CE to the minimum burst number indicated in table 500 for SCell activation operation. If the reference signal burst number indicated in the SCell activation MAC CE is equal or greater than the minimum value, the reference signal burst number may be considered valid and the UE 110 may utilize the corresponding reference signals bursts for SCell activation. However, if the burst number is less than the minimum value the UE 110 may instead utilize SSB based SCell activation and the corresponding rel-16 SSB based SCell activation delay requirement may be applied A gap may be configured between consecutive reference signal bursts to ensure adequate processing time on the UE 110 side. To provide an example within the context of the table 500 row 515, there may be a gap between the first burst and the second burst. The gap may provide the UE 110 with adequate time to determine the AGC gain using the first burst and then perform the time/frequency tracking using the second burst. In some embodiments, a minimum gap between the two bursts may be hard encoded in the 3GPP Standards. Each burst may be defined in a number of slots, in (ms) or in any other appropriate unit. In another example, the exact value of the gap may be configured by the network for each set of bursts with a restriction that the configured gap is not smaller than the minimum gap duration.

Figure 6:
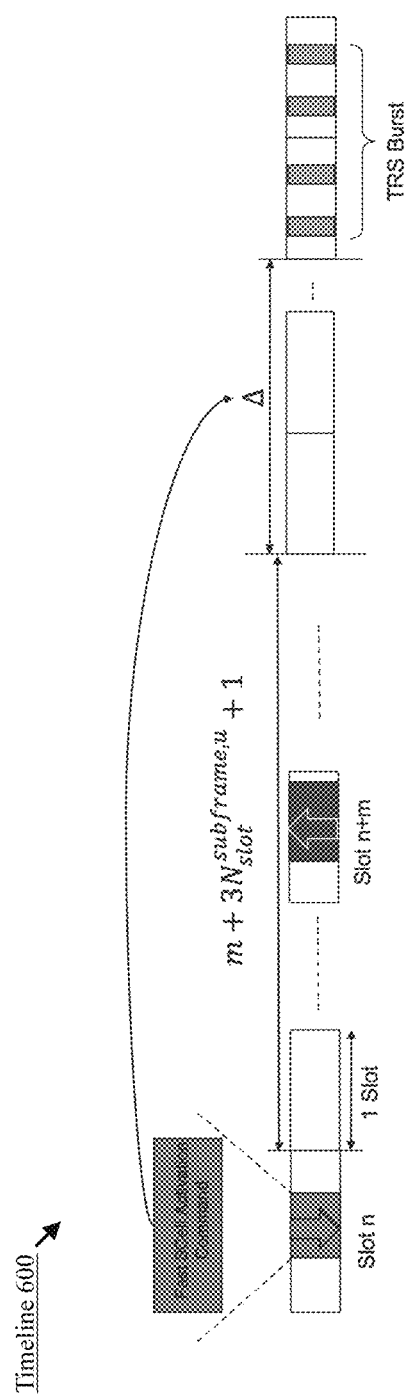
FIG. 6 shows timeline that illustrates an example of SCell activation with aperiodic reference signals according to various exemplary embodiments.

In some examples, the SCell activation information may also include an aperiodic triggering offset value (A). FIG. 6 shows timeline 600 that illustrates an example of SCell activation with aperiodic reference signals. In this example, the timeline 600 is shown as being measured in slots and a MAC CE representing a SCell activation command is received at slot (n).

The aperiodic triggering offset value (Δ) shown in the timeline 600 represents the duration between the TRS burst and the last symbol of the last downlink slot of the to be activated SCell overlapping with slot n+m+3 $N_{slot}^{subframe,u}$+1 where the UE 110 receives the SCell activation command for a SCell ending in slot n. Slot n+m may be configured for physical uplink control channel (PUCCH) transmission with hybrid automatic repeat request (HARQ) acknowledgement (ACK) information in response to the physical downlink shared channel (PDSCH) reception (e.g., the MAC CE). In some embodiments, the aperiodic triggering offset value (Δ) may be a negative value to enable an earlier TRS burst transmission if the UE 110 indicates it is capable of the feature in a capability report.

In some examples, the SCell activation configuration information may also include quasi co-location (QCL) information. The QCL information for the triggered reference signal resource set may be indicated in the MAC CE using a trigger state (TS) value. For example, the UE 110 may expect that a transmission configuration indicator (TCI) indicates a qcl-type set to "typeC" with one SSB for SCell activation purposes and qcl-type set to "typeD" with the same SSB. For intra-band CA where at least one CC in the same band is activated, the TRS resource set may be cross carrier typeC QCLed or typeD QCLed with SSB or periodic/semi-periodic TRS on another active intra-band CC. Thus, the QCL source information (e.g., TCI-state information) for the triggered TRS set (e.g., associated SSB index) may be indicated by the MAC CE using the TS values.

Figure 7:
FIG. 7 shows a table 700 that illustrates an example of the relationship between the value of the trigger state (TS) in a MAC CE, aperiodic offset value and the quasi co-location (QCL) information according to various exemplary embodiments.

FIG. 7 shows a table 700 that illustrates an example of the relationship between the value of TS in a MAC CE, aperiodic offset value and the QCL information. In this example, the TS fields are shown to include two-bit values that enable the network to support up to four different configurations. However, this is just an example, any appropriate TS field size may be utilized. In some embodiments, the size of the TS field in the MAC CE may be configured by higher layer signaling. In other embodiments, the size of the TS field may be hard encoded in the 3GPP Standards.

In some examples, the SCell activation configuration information may also include a flag information element (IE) indicating whether the reference signal resource set is to be utilized for SCell activation. For example, the ASN. 1 may include a fastSCellActivation-info field may be included for each aperiodic reference signal resource set to indicate whether the aperiodic reference signal sets are to be utilized for SCell activation operation. FIG. 8 shows an example ASN.1 for SCell activation configuration information.

The exemplary embodiments introduce a MAC CE that triggers both SCell activation and corresponding temporary aperiodic reference signals. This new MAC CE may be identified by a MAC subheader using a particular logical channel ID (LCID) value.

The MAC CE may have a fixed size and include multiple fields. In one example, the MAC CE may include a single-octet bitmap that contains seven $C_i$ fields and one reserved bit (R). In another example, the MAC CE may include a four-octet bitmap that contains 31 $C_i$ fields and one reserved bit (R). The $C_i$ field indicates that activation/deactivation status of the SCell corresponding to the SCell index "i." The field value may be set to a first value (e.g., 1) to indicate that the SCell i shall be activated. The field value may be set to a second value (e.g., 0) to indicate that the corresponding SCell i shall be deactivated.

Figure 9:
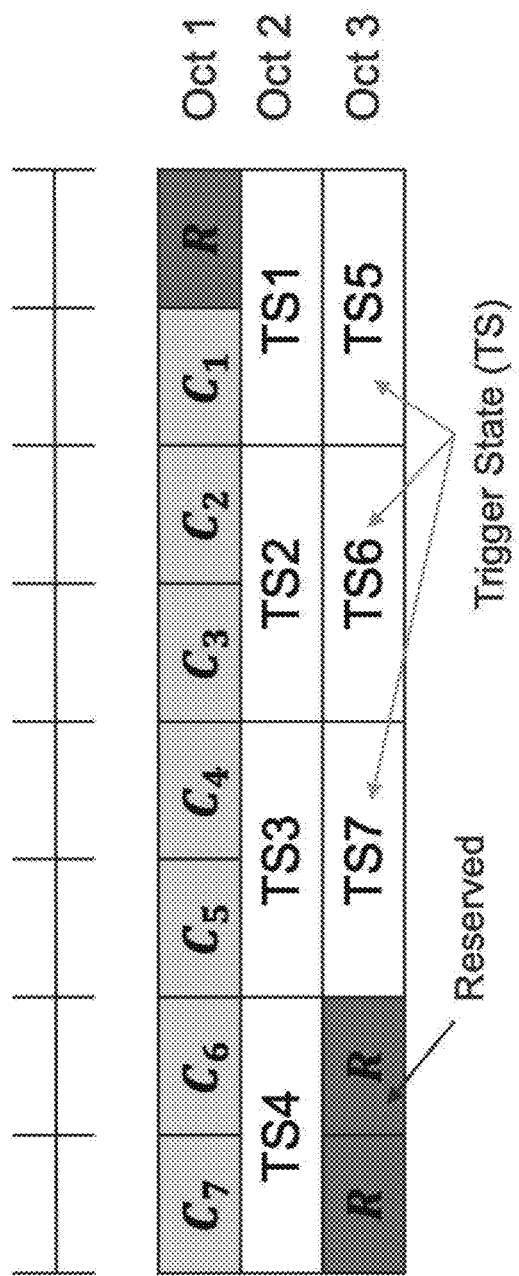
FIG. 9 shows an example of a MAC CE structure for SCell activation and temporary aperiodic reference signals according to various exemplary embodiments.

FIG. 9 shows an example of a MAC CE structure for SCell activation and temporary aperiodic reference signals. In this example, the MAC CE is a single-octet bitmap that contains seven $C_i$ fields and one reserved bit (R). In addition, there is a two-bit TS for each CC.

The value of the TS may indicate which resource set is to be utilized. For example, a TS value of "00" may indicate that no aperiodic TRS is triggered. A TS value of "01" may indicate that the TRS resource set associated with "01" was triggered, a TS value of "10" may indicate that the TRS resource set associated with "10" was triggered and a TS value of "11" may indicate that the TRS resource set associated with "11" was triggered. In some embodiments, if the $C_i$ field of the associated serving cell i is set to be "1" in the same MAC CE, the UE 110 may fall back to rel-16 SSB based SCell activation for serving cell i.

In some embodiments, a common TS field may be implemented to minimize the overhead of the MAC CE. In addition, a $F_i$ field may be introduced to provide the network with flexibility to also use rel-16 SSB based SCell activation. Like the MAC CE reference above, this MAC CE may include a single-octet bitmap that contains seven $C_i$ fields and one reserved bit (R) or a four-octet bitmap that contains 31 $C_i$ fields and one reserved bit (R). In addition, a bitmap field may also contain seven $F_i$ fields or 31 $F_i$ fields. The field value of each $F_i$ may indicate the type of SCell activation to be utilized. A field value set to "1" may indicate that the to be activated SCell i is to use a TRS resource set triggered by this MAC CE and the field value set to "0" to indicate that the to be activated SCell i is to use SSBs.

Figure 10:
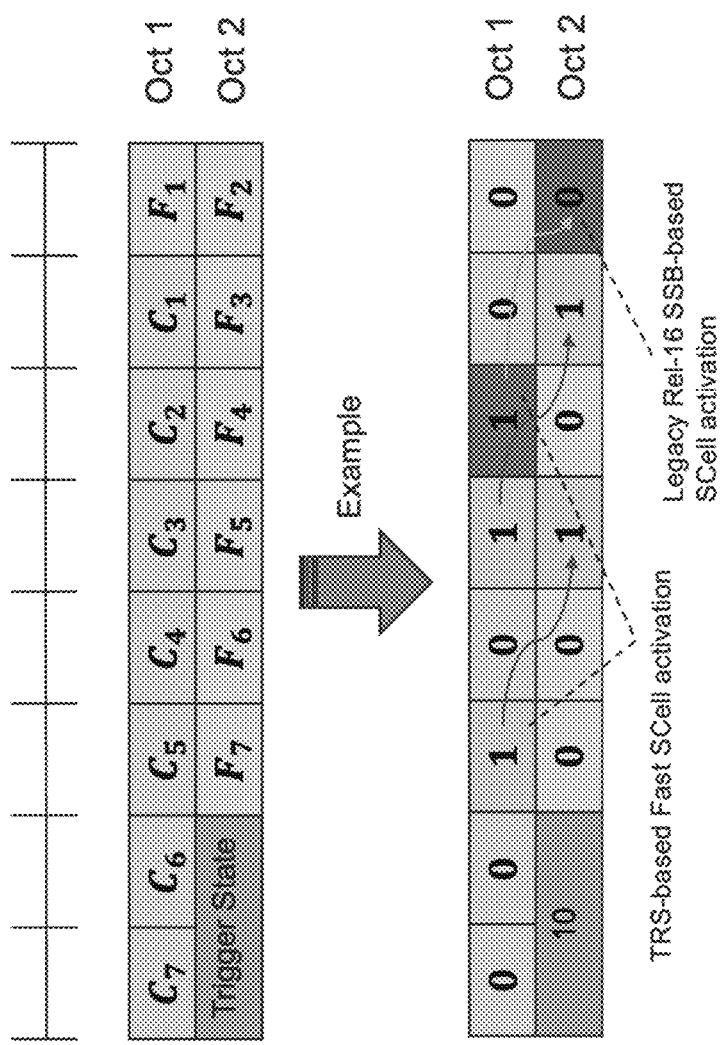
FIG. 10 shows an example of a MAC CE structure for SCell activation that is configured to trigger both TRS and SSB for the to be activated SCells according to various exemplary embodiments.

FIG. 10 shows an example of a MAC CE structure for SCell activation that is configured to trigger both TRS and SSB for the to be activated SCells. In this example, there are eight CCs. The network activates CC2 using SSB based approach, CC3 using and CC5 using the TRS approach.

The association between TS and a TRS resource set on a set of serving cells with $F_i$ field is set to 1. For example, a TS state of "00" may indicate that the aperiodic TRS resource set associated with "00" was triggered for all CCs with $F_i$=1, a TS state of "01" may indicate that the aperiodic TRS resource set associated with "01" was triggered for all CCs with $F_i$=1, a TS state of "10" may indicate that the aperiodic TRS resource set associated with "10" was triggered for all CCs with $F_i$=1 and a TS state of "11" may indicate that the aperiodic TRS resource set associated with "11" was triggered for all CCs with $F_i$=1. Alternatively, a per CC TS may be used. In the example of FIG. 10, the TS state is set to "10."

Figure 11:
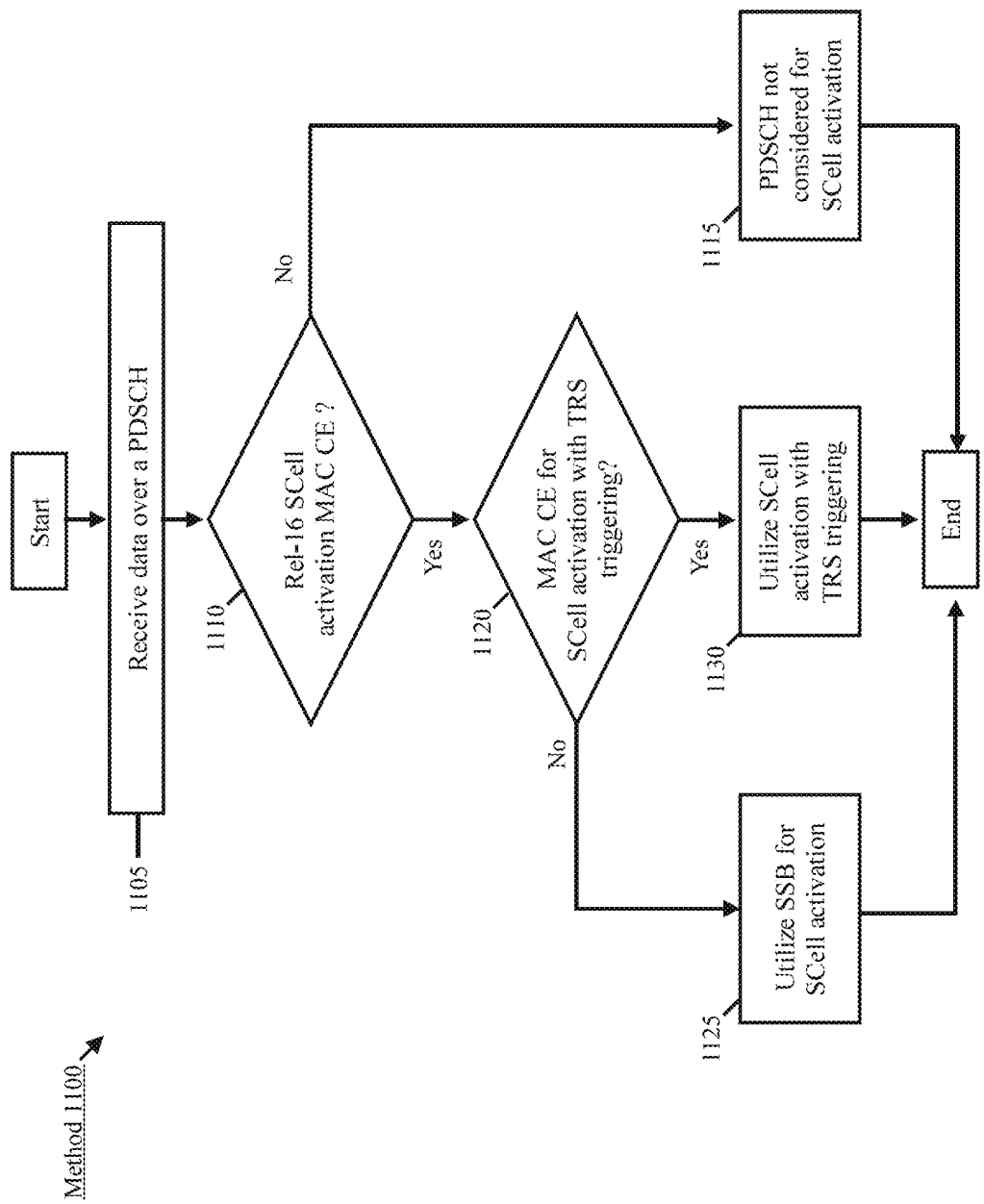
FIG. 11 shows a method for processing physical downlink shared channel (PDSCH) that includes one or more MAC CEs configured for SCell activation according to various exemplary embodiments.

In some embodiments, two separate MAC CEs may be used. One MAC CE for rel-16 SSB based SCell activation and one MAC CE for SCell activation with TRS triggering. FIG. 11 shows a method 1100 for processing PDSCH that includes one or more MAC CES configured for SCell activation according to various exemplary embodiments. The method 1100 is described from the perspective of the UE 110 and it is assumed that at least one SCell is currently in the deactivated state.

In 1105, the UE 110 receives data over the physical downlink shared channel (PDSCH). In 1110, the UE 110 determines whether the PDSCH includes a Rel-16 SCell activation MAC CE. If the PDSCH does not include a Rel-16 SCell activation MAC CE, the method 1100 continues to 1115. In 1115, the UE 110 does not consider the PDSCH for SCell activation operation because the UE 110 does not expect to receive PDSCH MAC CE that triggers aperiodic TRS transmission on a deactivated SCell without any Rel-16 SCell activation MAC CE configured to activate the deactivated SCell.

Returning to 1110, if the PDSCH includes a Rel-16 MAC SCell activation MAC CE, the method 1100 continues to 1120. In 1120, the UE 110 determines whether the PDSCH includes a MAC CE to trigger TRS for SCell activation. If the PDSCH does not include a MAC CE for SCell activation with TRS triggering, the method continues to 1125. In 1125, the UE 110 utilizes the SSB for SCell activation operation.

Returning to 1120, if the PDSCH includes a MAC CE for SCell activation with TRS triggering, the method 1100 continues to 1130. In 1130, UE 110 utilizes the SCell activation with TRS triggering procedure. In some embodiments, to minimize uplink overhead and ensure reliability of TRS triggering, the two MAC CEs may be mapped to the same PDSCH in a same slot. Thus, a single HARQ-ACK feedback may acknowledge the reception of both MAC CEs.

Instead of the new MAC CE introduced above and the multi-MAC CE approach described in the method 1100, the rel-16 MAC CE for SCell activation may be reused. In this approach, an aperiodic TRS resource set may be configured by RRC signaling and is used by default without the need of additional signaling.

The exemplary embodiments also introduce techniques to reduce latency of the SCell activation with TRS triggering. One technique includes implementing a set of pre-configured aperiodic CSI-RS for SCell activation. One of these pre-configured aperiodic CSI-RS resource sets may be selected by the MAC CE through a CSI-RS triggering field common to all CCs or on a per-CC basis. Alternatively, a default CSI-RS resource set may be configured and is used when there is no CSI-RS triggering field included in the MAC CE. This would allow a further reduction in signaling overhead.

Figure 12:
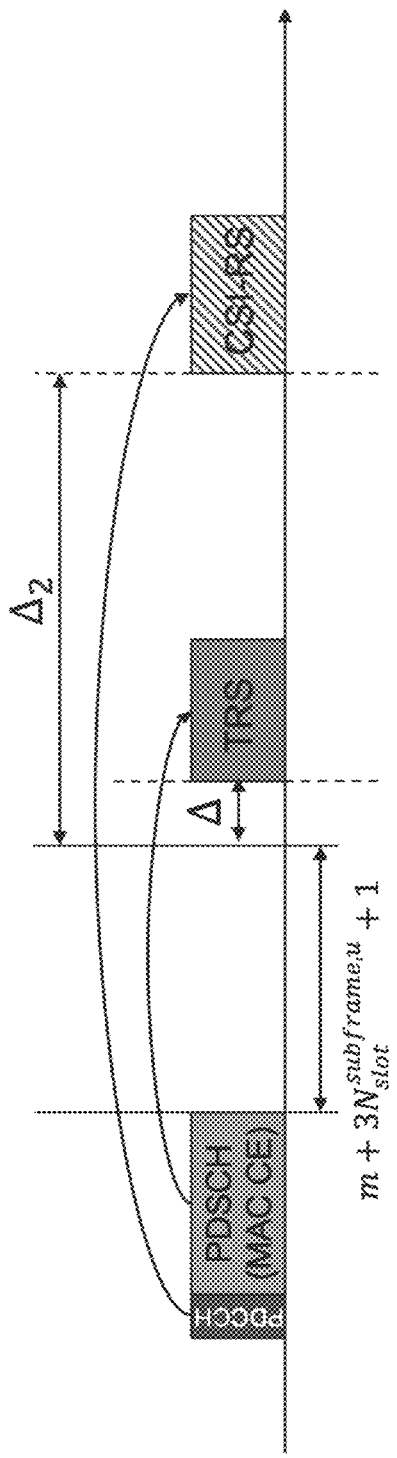
FIG. 12 shows a timeline for SCell activation with tracking reference signal (TRS) triggering and channel state information (CSI)-reference signal (RS) triggering according to various exemplary embodiments.

Another technique relates to introducing a CSI-RS timing offset. FIG. 12 shows a timeline 1200 for SCell activation with TRS triggering and CSI-RS triggering information element (IE) in downlink control information (DCI). Like the timeline 600, the timeline 1200 includes an aperiodic triggering offset value (Δ) which represents the duration between the TRS burst and the last symbol of the last downlink slot of the to be activated SCell overlapping with slot $n+m+3N_{slot}^{subframe,u}+1$ where the UE 110 receives the SCell activation command for a SCell ending in slot n. In this example, a CSI-RS triggering IE is included in the DCI format received in the physical uplink control channel (PUCCH) that schedules the PDSCH reception consisting of the MAC CE. The CSI-RS timing offset ($\Delta_2$) may be defined relative to the slot $n+m+3N_{slot}^{subframe,u}+1$.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of a user equipment (UE) configured to perform operations comprising:
   receiving secondary cell (SCell) activation configuration information from a first cell;
   receiving a gap between burst value indicating a duration between a first burst of aperiodic reference signals to be transmitted to the UE and a second burst of aperiodic reference signals to be transmitted to the UE;
   receiving a medium access control (MAC) control element (CE) from the first cell, wherein the MAC CE indicates that a SCell state is to be changed from a deactivated state to an activated state; and
   receiving the first burst of aperiodic reference signals and the second burst of aperiodic reference signals from a secondary cell (SCell), wherein the reception of the aperiodic reference signals is triggered by the MAC CE.

2. The processor of claim 1, wherein the SCell activation configuration information is provided in one or more radio resource control (RRC) messages and includes resource set parameters associated with the aperiodic reference signals.

3. The processor of claim 2, wherein the resource set parameters indicate that the aperiodic reference signals are to be transmitted in a number of bursts, each burst including multiple samples.

4. The processor of claim 3, wherein a minimum number of bursts is based on one or more of a frequency range, whether the SCell is known or unknown, a measurement cycle duration for the SCell and carrier aggregation (CA) parameters.

5. The processor of claim 3, wherein a single burst provides a basis for automatic gain control (AGC) settling and time and frequency tracking.

6. The processor of claim 3, wherein the first burst provides a basis for automatic gain control (AGC) settling and the second burst provides a basis for time and frequency tracking.

7. The processor of claim 3, the operations further comprising:
   determining whether the number of the bursts satisfies a minimum threshold value; and
   when the number of the bursts is smaller than the threshold value, utilizing synchronization signal block (SSB) for SCell activation.

8. The processor of claim 3, wherein the resource set parameters include an aperiodic offset value that represents a duration between a slot of the aperiodic reference signals and $n+m+3N_{slot}^{subframe,u}+1$, wherein n represents a slot index in which the MAC CE was slot received and n+m represents a slot index where the UE is to provide feedback over a physical uplink control channel (PUCCH).

9. The processor of claim 3, wherein the resource set parameters include quasi co-location (QCL) relationship information comprising transmission configuration indicator (TCI) state information for aperiodic reference signals with an associated synchronization signal block (SSB) index.

10. The processor of claim 9, wherein a QCL source for the aperiodic reference signal is indicated by the MAC CE from a set of QCL sources configured by radio resource control (RRC) signaling by using a trigger state (TS) field of the MAC CE.

11. A user equipment (UE), comprising:
   a transceiver configured to communicate with a first cell and a secondary cell; and
   a processor communicatively coupled to the transceiver and configured to perform operations comprising:
      receiving secondary cell (SCell) activation configuration information from the first cell;
      receiving a gap between burst value indicating a duration between a first burst of aperiodic reference signals to be transmitted to the UE and a second burst of aperiodic reference signals to be transmitted to the UE;
      receiving a medium access control (MAC) control element (CE) from the first cell, wherein the MAC CE indicates that a SCell state is to be changed from a deactivated state to an activated state; and
      receiving a first burst of aperiodic reference signals and the second burst of aperiodic reference signals from the secondary cell (SCell), wherein the reception of the aperiodic reference signals is triggered by the MAC CE.

12. The UE of claim 11, wherein the SCell activation configuration information is provided in one or more radio resource control (RRC) messages and includes resource set parameters associated with the aperiodic reference signals.

13. The UE of claim 12, wherein the resource set parameters indicate that the aperiodic reference signals are to be transmitted in a number of bursts, each burst including multiple samples.

14. The UE of claim 13, wherein a minimum number of bursts is based on one or more of a frequency range, whether the SCell is known or unknown, a measurement cycle duration for the SCell and carrier aggregation (CA) parameters.

15. The UE of claim 13, wherein a single burst provides a basis for automatic gain control (AGC) settling and time and frequency tracking.

16. The UE of claim 13, wherein the first burst provides a basis for automatic gain control (AGC) settling and the second burst provides a basis for time and frequency tracking.

17. The UE of claim 13, the operations further comprising:
   determining whether the number of the bursts satisfies a minimum threshold value; and
   when the number of the bursts is smaller than the threshold value, utilizing synchronization signal block (SSB) for SCell activation.

18. The UE of claim 13, wherein the resource set parameters include an aperiodic offset value that represents a duration between a slot of the aperiodic reference; signals and $n+m+3N_{slot}^{subframe,u}+1$, wherein n represents a slot index in which the MAC CE was received and n+m represents a slot index where the UE is to provide feedback over a physical uplink control channel (PUCCH).

19. The UE of claim 13, wherein the resource set parameters include quasi co-location (QCL) relationship information comprising transmission configuration indicator (TCI) state information for aperiodic reference signals with an associated synchronization signal block (SSB) index.

20. The UE of claim 19, wherein a QCL source for the aperiodic reference signal is indicated by the MAC CE from a set of QCL sources configured by radio resource control (RRC) signaling by using a trigger state (TS) field of the MAC CE.

* * * * *